United States Patent [19]

Weitkamp et al.

[11] Patent Number: 5,166,432
[45] Date of Patent: Nov. 24, 1992

[54] PROCESS FOR THE PRODUCTION OF CYANAMIDE

[75] Inventors: Jens Weitkamp, Oldenburg; Stefan Ernst, Stuttgart; Heinrich Röck, Trostberg; Kurt Scheinost, Trostberg; Benedikt Hammer, Trostberg; Werner Goll, Garching; Horst Michaud, Trostberg, all of Fed. Rep. of Germany

[73] Assignee: SKW Trostberg Aktiengesellshaft, Trostbert, Fed. Rep. of Germany

[21] Appl. No.: 747,758

[22] Filed: Aug. 20, 1991

[30] Foreign Application Priority Data

Aug. 21, 1990 [DE] Fed. Rep. of Germany ....... 4026364

[51] Int. Cl.$^5$ .......................................... C07C 261/04
[52] U.S. Cl. .................................................. 564/106
[58] Field of Search ...................... 564/103, 368, 106; 423/371

[56] References Cited

U.S. PATENT DOCUMENTS 4,625,061 11/1986 Van Hardeveld et al. ......... 564/163

FOREIGN PATENT DOCUMENTS 0036249  9/1981  European Pat. Off. .
0037168 10/1981  European Pat. Off. .
0156421 10/1985  European Pat. Off. .
0185525  6/1986  European Pat. Off. .

OTHER PUBLICATIONS i2-Procestechnologie, No. 2-1987, pp. 11-13, P. C. van Geem et al., "Synthese van cyaanamide uit ureum".

Primary Examiner—Wayne Langel
Attorney, Agent, or Firm—Nikaido, Marmelstein, Murray & Oram

[57] ABSTRACT

The present invention provides a process for the production of cyanamide from urea and/or decomposition products thereof at an elevated temperature with the use of a microporous catalyst, wherein, as catalyst, there is used a zeolite and/or a silicoalumophosphate which is doped with transition metal cations selected from the Group IB and VIIB of the Periodic System. In this way, it is possible to increase the conversion, referred to urea, to 60 to 100%, the selectivity with regard to cyanamide thereby being from about 30 to 50% and with regard to the undesired melamine being ≦2%.

15 Claims, No Drawings

PROCESS FOR THE PRODUCTION OF CYANAMIDE

The present invention is concerned with a process for the production of cyanamide from urea or from decomposition products of urea on microporous catalysts.

Cyanamide is a technically important starting material in the production of fertilisers, plant protection agents, pharmaceuticals and a number of other valuable products.

From European Patent Specification No. 0,156,421 B1 it is known to produce cyanamide or a cyanamide-containing gas mixture by the reaction of urea or decomposition products thereof (cyanic acid/isocyanic acid) on zeolite catalysts with a pore diameter of, at most, 0.8 nm. The reaction takes place at temperatures of from 200° to 600° C. and with residence times of from 0.1 seconds to several minutes. Values of from 0.1 to 3 bar are given as the partial pressure of the starting material. As catalysts, there are used mordenite zeolites of varyingly strong acidity. In a publication of P. C. van Geem et al. (i²-Procestechnologie, No. 2, pp. 11–13/1987), there are reported the experimental results with the zeolites H-X, H-ZSM-5, H-clinoptilolith and H-erionite/chabasite. The best results with regard to the selectivity for cyanamide were achieved with those catalysts in which the active centres on the outer surface of the zeolite crystallites had been poisoned according to published European Patent Specification No. 0,083,543 A1. In the case of such modified zeolites, the formation of the undesired bulky melamine on the outer crystallite surface is to be clearly suppressed in favour of the formation of cyanamide in the form-selectively active pore interiors.

According to the Examples of European Patent Specification No. 0,156,421 B1, in the case of reaction temperatures of from 390° to 420° C., only conversions of at most 36.3% are achieved. As products, there are exclusively mentioned cyanamide and melamine but it is not clear whether the given percentage values refer to the weight or to the material amount of the products. References to further possible by-products are not given.

Due to the low conversions achieved, a considerable separation expense for educt/product is necessary. This is to be coupled with large currents of material to be recycled of unreacted urea and/or of unreacted isocyanic acid/cyanic acid.

Therefore, it is an object of the present invention to provide a process for the production of cyanamide from urea or from the decomposition products thereof with the help of a microporous catalyst which substantially or completely avoids the mentioned disadvantages of the prior art and which, in particular, combines high conversions with good selectivities and, at the same time, reduces the selectivities for undesired by-products, for example melamine.

Thus, according to the present invention, there is provided a process for the production of cyanamide from urea and/or decomposition products thereof at an elevated temperature and with the use of a microporous catalyst, wherein, as catalyst, there is used a zeolite and/or a silicoalumophosphate which is doped with transition metal cations selected from Group IB and VIIB of the Periodic System.

Surprisingly, we have been able to show that, with the catalyst used according to the present invention, it is possible to achieve substantially higher conversions of urea and of isocyanic acid/cyanic acid and, at the same time, the selectivities for cyanamide are very high in comparison with the prior art.

Furthermore, in the process according to the present invention, further valuable by-products with NCN structure are formed, for example dicyandiamide, cyanurea and guanidine carbonate, which was also not to have been foreseen. Finally, the selectivities with regard to the undesired by-product melamine are, at far below 5%, referred to the weight of the reacted cyanamide, substantially lower than described, for example, in European Patent Specification No. 0,156,421 B1.

In the case of the process according to the present invention, the decomposition of urea is carried out on special catalysts based on zeolites or silicoalumophosphates, the active centres of which have been modified wholly or partly by cations of metals of Group IB and/or Group VIIB of the Periodic System. As metals, there can be used copper, silver, gold and manganese. Use can be made of the cations of one or more of the said metals.

From the group of the zeolites, there can, in principle, be used all narrow, average and wide pored zeolites for the process according to the present invention, the pore diameters of which are usually from 0.3 to 1.5 nm. Especially preferred are the zeolites ZSM-5, ZSM-58, EU-1, NaY, H-Y, BSS and Beta, the active centres of which can be exchanged particularly well by transition metal cations.

Besides the zeolites, as catalysts in the process according to the present invention, there can also be used silicoalumophosphates, insofar as they display a sufficient ion exchange capacity. Preferred representatives of this group of materials include Sapro-5, Sapro-11, Sapro-31, Sapro-37, Sapro-41 and MCM-9.

The ion exchange capacity of the zeolites and silicoalumophosphates depends upon the Si/Al and Si/Al/P ratio, respectively. The larger is the Si/Al ratio in the case of the zeolites, the smaller is the ion exchange capacity. Consequently, the zeolites used according to the present invention should have preferably an Si/Al ratio of from 1.5 to 150 and especially preferably of from 2 to 120. In the case of the silicoalumophosphates, the preferred composition, expressed as $Si_xAl_yP_z$, lies in the ranges of $0.02 \leq x \leq 0.98$; $0.02 \leq y \leq 0.60$; $0.02 \leq z \leq 0.52$.

It is important for the present invention that the ion exchange of the zeolites or silicoalumophosphates is carried out with transition metal cations selected from Group IB and Group VIIB of the Periodic System since only the catalysts doped with these metal cations show the desired activity or selectivity in the case of the urea decomposition.

Especially preferred are catalysts doped with copper, silver and manganese cations. The amount ratio of transition metal cations to zeolite or silicoalumophosphate can be varied within wide limits but it has proved to be advantageous when at least 10% of the exchange capacity present of the catalyst is exchanged with transition metal cations. Even more advantageous is a practically complete exhaustion of the ion exchange capacity: within the scope of the present invention, it is even possible to impregnate the catalyst with metal cations beyond the ion exchange capacity.

The doping by ion exchange or impregnation of the catalysts used according to the present invention can be carried out without problems by known and conventional processes.

The decomposition of the urea preferably takes place at a temperature of from 300° to 700° C. and especially of from 450° to 550° C.

The reaction is preferably carried out in such a manner that the urea is evaporated in a fluidised bed, in which case this is substantially broken down into isocyanic acid and cyanic acid. The mixture containing these decomposition products is passed with the help of a fluidisation or entraining gas, for example ammonia, to a solid reactor containing the catalyst used according to the present invention. After a residence time of from about 0.1 to 10 seconds, the reaction mixture is cooled and possibly worked up.

With the help of the process according to the present invention, it is possible to increase the conversion, referred to urea, to 60 to 100%, the selectivities with regard to cyanamide thereby being about 30 to 50% and with regard to the undesired melamine being $\leq 2\%$.

The following Examples are given for the purpose of illustrating the present invention.

DESCRIPTION OF THE EXPERIMENTAL APPARATUS

The experiments are carried out at atmospheric pressure in a flow apparatus. As starting material, there is used urea. Via a metering screw, this is introduced into a fluidised bed of sand thermostated to a temperature of from 400° to 550° C. where the urea evaporates and thereby decomposes to give a mixture of isocyanic acid and cyanic acid. Ammonia is used as fluidising gas and as entraining gas. The gas mixture produced in this way is passed via heated pipes into the solid bed reactor containing the catalyst. The reaction products are condensed out at $-20°$ C. in a cold trap directly behind the reactor and, after working up, are analysed. By means of quantitative thin layer chromatography, the following products are determined analytically: urea, cyanamide, dicyanamide, cyanurea, guanidine carbonate and melamine.

CARRYING OUT OF THE EXPERIMENTS

The catalyst are pressed without binder, ground and sieved. The grain fraction of 0.2 to 0.3 mm. is used for the catalytic experiments. The bulk volume of the catalyst typically amounts to about 3 cm$^3$. Before the reaction, the catalysts are dried for 12 hours in situ in a current of nitrogen ($V_{N_2}^0 = 6$ liters/hour) at 550° C.

EXAMPLES

The Examples set out in the following describe typical catalysts and typical product selectivities. The description given in the Examples is in no way to limit the scope of the present invention.

EXAMPLE 1

Reaction of urea on MnZSM-5

Zeolite HZSM-5 (Si/Al ratio about 112) was treated twice, in each case for 3 hours, at 80° C. with a large excess (20 g. of zeolite in 250 cc. of solution) of a 0.05 molar aqueous solution of manganese acetate.

The catalytic tests took place under standard conditions, i.e. residence time $\tau \sim 2$ seconds, urea throughput about 5 g./hour, $V_{NH_3}^0/m_{Ha} \sim 20$ l./g., experimental period 2.5 hours, variation of the reaction temperature from 450° to 550° C. in steps of 50° C.

The experimental results obtained are set out in the following Table 1:

TABLE 1

| Urea reaction on MnZSM-5 | | | | | | |
|---|---|---|---|---|---|---|
| T, °C. | $X_{Ha}$, % | $S_{Cy}$, % | $S_{DCD}$, % | $S_{CH}$, % | $S_{GC}$, % | $S_{Mel}$, % |
| 450 | 100 | 38.3 | 7.5 | 4.1 | traces | 1.2 |
| 500 | 92.9 | 40.2 | 2.6 | 2.9 | traces | traces |
| 550 | 100 | 40.3 | 0.9 | 6.3 | traces | traces |

Abbreviations

T: temperature; $\tau$: residence time; X: conversion; S: selectivity; Ha: urea; Cy: cyanamide; DCD: dicyandiamide; CH: cyanurea; GC: guanidine carbonate; Mel: melamine.

As can be seen, the urea conversions are from 90 to 100%. The cyanamide selectivities amount to 38 to 40%, whereas guanidine carbonate and melamine are only formed in traces.

EXAMPLE 2

Reaction of urea on CuZSM-5

Zeolite HZSM-5 according to Example 1, was subjected to three ion exchanges with an excess of a 0.1N copper sulphate solution at ambient temperature. The final catalyst had a bluish colour (hydrated cupric ions).

The catalytic tests took place under standard conditions according to Example 1.

The experimental results obtained are set out in the following Table 2:

TABLE 2

| Urea reaction on CuZSM-5 | | | | | |
|---|---|---|---|---|---|
| T, °C. | $X_{Ha}$, % | $S_{Cy}$, % | $S_{DCD}$, % | $S_{CH}$, % | $S_{GC}$, % |
| 450 | 87.2 | 29.7 | 18.7 | 17.3 | 1.2 |
| 500 | 89.4 | 37.6 | 26.2 | 10.3 | 2.9 |
| 550 | 92.5 | 44.9 | 15.5 | 13.4 | 0.9 |

The urea conversions are here 87 to 93% and the cyanamide selectivities are from about 30 to 45%.

The selectivities of all NCN compounds (cyanamide, dicyandiamide, cyanurea and guanidine carbonate) are from 58 to 69%.

EXAMPLE 3

Reaction of urea on AgNaY

Zeolite AgNaY was prepared by ion exchange three times of, in each case, 25 g. NaY (Si/Al ratio about 2.4) in 500 ml. of a 0.5N solution of silver nitrate at ambient temperature.

The catalytic tests took place under standard conditions corresponding to Example 1.

The experimental results obtained are set out in the following Table 3:

TABLE 3

| Urea reaction on AgNaY | | | | | |
|---|---|---|---|---|---|
| T, °C. | $X_{Ha}$, % | $S_{Cy}$, % | $S_{DCD}$, % | $S_{CH}$, % | $S_{GC}$, % |
| 450 | 71.8 | 38.7 | 32.2 | 18.6 | 0.7 |
| 500 | 68.6 | 31.6 | 18.8 | 20.5 | 1.3 |
| 550 | 61.0 | 48.1 | 22.6 | 20.2 | 1.3 |

There were hereby achieved urea conversions of from 60 to 70%, as well as cyanamide selectivities of from 31 to 48%.

We claim:

1. Process for the production of cyanamide from urea and/or decomposition products thereof at an elevated temperature with the use of a microporous catalyst, wherein, as catalyst, there is used a zeolite and/or a silicoalumophosphate, which is doped with at least one transition metal cation selected from Group IB and VIIB of the Periodic System.

2. Process according to claim 1, wherein the catalyst based on zeolites or silicoalumophosphates is doped with one or more cations of the metals copper, silver and manganese.

3. Process according to claim 1, wherein the zeolite used has an Si/Al ratio of from 1.5 to 150.

4. Process according to claim 3, wherein the zeolite used has an Si/Al ratio of from 2 to 120.

5. Process according to claim 1, wherein there is used a silicoalumophosphate of the composition $Si_xAl_yP_z$ in the limits of $0.02 \leq x \leq 0.98$; $0.02 \leq y \leq 0.60$; $0.02 \leq z \leq 0.52$.

6. Process according to claim 1, wherein at least 10% of the exchange capacity of the catalyst present is occupied with the said transition metal cations.

7. Process according to claim 1, wherein a catalyst is used, all of the cation binding positions of which are occupied with the said cations and which is additionally impregnated with these cations.

8. Process according to claim 1, wherein a catalyst is used with a pore width of 0.3 to 1.5 nm.

9. Process according to claim 1, wherein cyanamide is produced by decomposition of urea, and the decomposition of the urea is carried out at a temperature of from 300° to 700° C.

10. Process according to claim 9, wherein the decomposition of the urea is carried out at a temperature of from 450° to 550° C.

11. Process according to claim 1, wherein the contact time of the reaction mixture on the catalyst is from 0.1 to 10 seconds.

12. Process according to claim 1, wherein the urea and/or the thermal decomposition products thereof is contacted in gaseous form with the solid catalyst and subsequently the product mixture is separated out by cooling.

13. The process according to claim 1, wherein the conversion rate of urea is between 60–100% and 5% or less melamine is produced as a by product.

14. The process according to claim 13 wherein 2% or less melamine is produced as a by product.

15. Process for the production of cyanamide from urea consisting essentially of:
a) doping zeolite and/or a silicoalumophosphate with transition metal cations selected from Groups IB and VIIB of the periodic system to form a doped catalyst, and
b) reacting said doped catalyst with urea or decomposition products thereof at an elevated temperature to form cyanamide.

* * * * *